S. CRANE.
Milk-Pail.

No. 204,802.     Patented June 11, 1878.

Witnesses
John Becker
Fred. Haynes

Inventor
Seymour Crane
by his Attorneys
Brown & Allen

UNITED STATES PATENT OFFICE.

SEYMOUR CRANE, OF DALTON, MASSACHUSETTS.

IMPROVEMENT IN MILK-PAILS.

Specification forming part of Letters Patent No. 204,802, dated June 11, 1878; application filed April 23, 1878.

*To all whom it may concern:*

Be it known that I, SEYMOUR CRANE, of Dalton, in the county of Berkshire and State of Massachusetts, have invented certain new and useful Improvements in Milk-Pails, of which the following is a description, reference being had to the accompanying drawing, forming part of this specification.

This invention relates to improvements in that class of milk-pails which are provided with a funnel-shaped cover having a strainer in its bottom.

The invention consists in a funnel-shaped cover tightly fitting the pail, and constructed with an inclined bottom, terminating at the lower end in a small orifice for the passage of the milk into the pail, but which prevents the entrance of foul air to the contents of the pail while milking, said cover having at its upper edge lateral flanges, one for supporting the cover in the pail and the other for supporting and holding within the funnel-shaped cover an independent and removable strainer, all of which will be hereinafter set forth.

Figure 1:
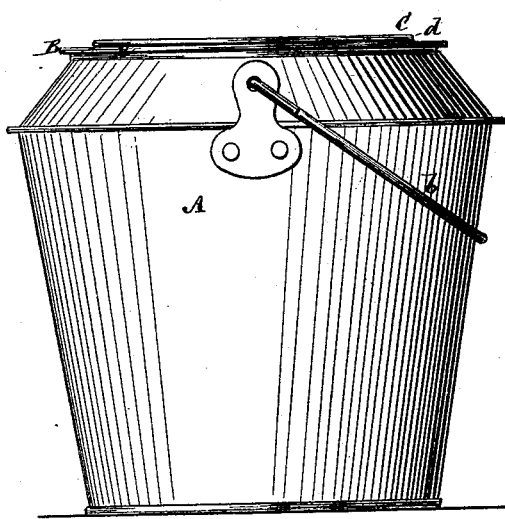
Figure 2:
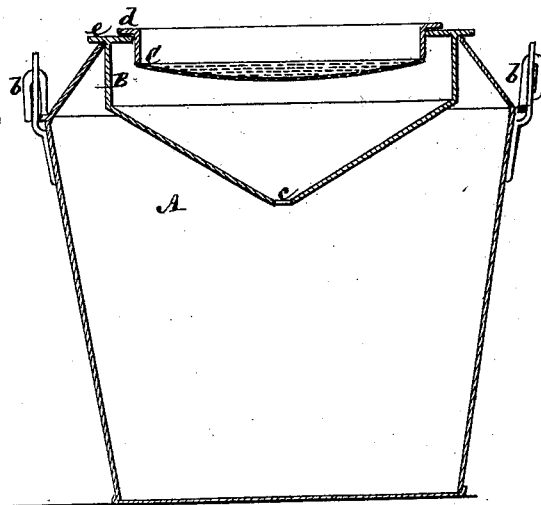

In the accompanying drawing, Figure 1 represents an outside view of a milk-pail constructed in accordance with my invention, and Fig. 2 a vertical section of the same.

A is the main body of the pail, or pail proper, which may be made of any desired material and of any suitable shape, and may be provided with the usual bail or handle *b*.

B is the cover of the pail. This cover is constructed to fit in a close manner the mouth or upper open end of the pail; and when it is required to empty the pail or to pour the contents of one pail into another, said cover may be removed; but the necessity for removal may be obviated by furnishing the pail with a spout below the rim. When using the pail to milk into, the cover B is kept closed.

To make the covered pail thus available as a receptacle, said cover B is of funnel-like construction, and has the orifice *c* through it, of no larger dimensions than is necessary for the milk when milking into the pail to pass through. Thus the pail may be filled with the cover on it; but the filling-orifice is of such restricted dimensions that foul odors—as, for instance, those of the stable or farm-yard—are excluded from the inside of the pail, or from absorption by the milk in the pail; and in case of the pail being upset, the cover being tightly fitted to the pail and its filling-orifice being of such small size, there can be no rapid escape of milk from the pail, and no extensive one before the pail can be put into its upright position again.

C is a removable screen, constructed to closely fit within the mouth of the funnel-shaped cover B, and supported in position by a flange, *d*, arranged to rest upon an upper flange, *e*, of the funnel-shaped cover. Such removable screen or strainer C serves to exclude dust, hairs, or other extraneous matter from the inside of the pail when milking into it, or at other times, and may readily be removed, when required, without removing the funnel-shaped cover, or may be removed in common with said cover, as desired.

I am aware that a funnel-shaped cover having a strainer in its bottom has been made to tightly fit a pail; but such is not my invention, and is hereby disclaimed.

I claim—

The funnel-shaped cover B, having the inclined bottom, terminating at the center in a small orifice, *c*, and constructed with lateral flanges at its upper edge, one for supporting the cover in a pail, in combination with the independent and removable strainer having the lateral flange *d*, resting on one of the flanges of the funnel shaped cover, for supporting the strainer within the upper portion of said cover, substantially as and for the purpose described.

SEYMOUR CRANE.

Witnesses:
HENRY T. BROWN,
FRED. HAYNES.